United States Patent Office 2,799,777
Patented July 16, 1957

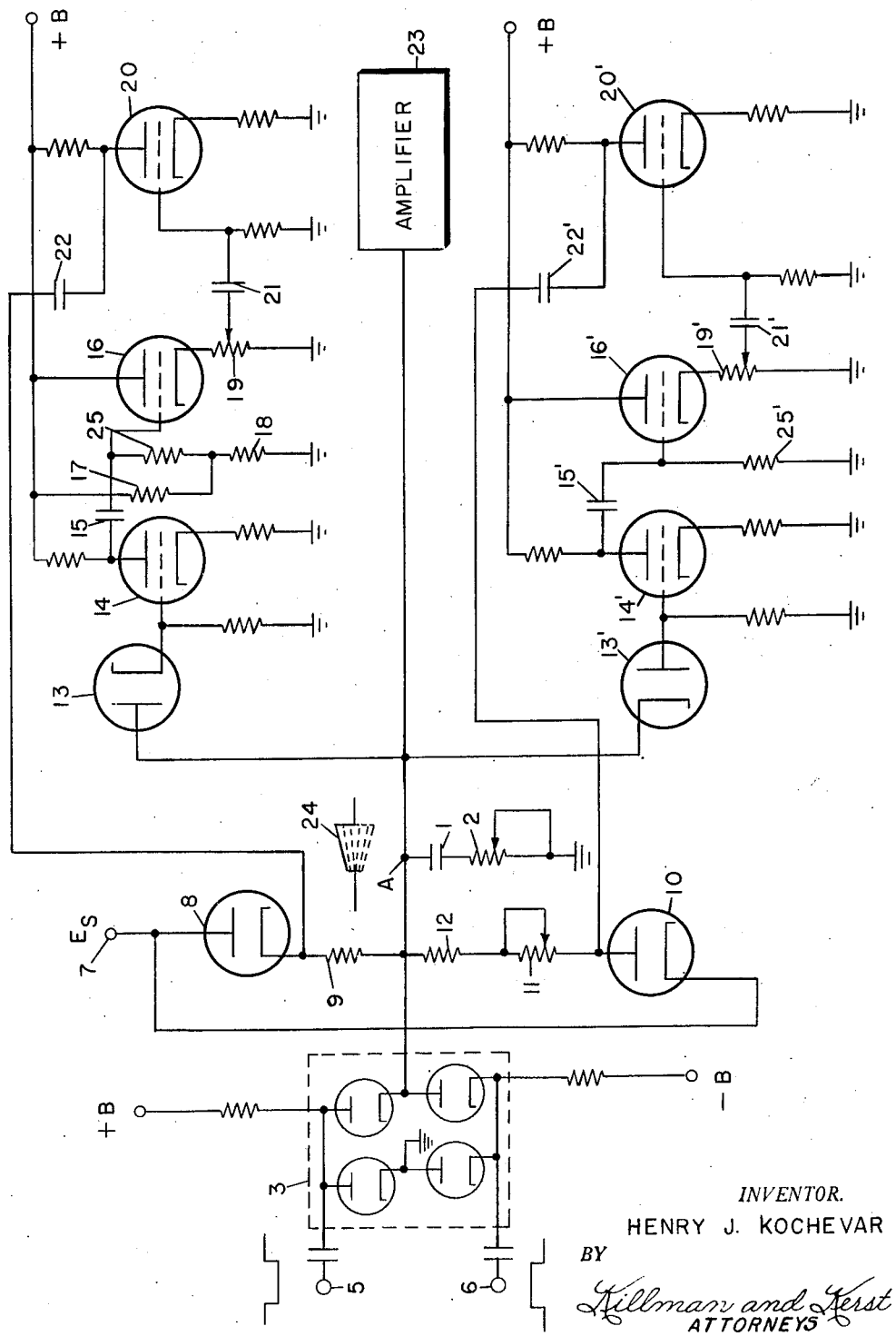

2,799,777

BIPOLAR SAWTOOTH GENERATOR

Henry J. Kochevar, Baltimore, Md., assignor to Bendix Aviation Corporation, Towson, Md., a corporation of Delaware Application August 18, 1954, Serial No. 450,618

3 Claims. (Cl. 250—27)

This invention relates in general to circuits for the generation of sawtooth waveforms and particularly to circuits capable of generating linear sawtooth waveforms of varying amplitude and polarity in response to similarly varying input voltages.

Prior art developments have utilized various expedients involving feedback to generate linear sawtooth voltages where the exciting voltage was unipolar in character.

None of these expedients are operable, however, to solve the problem of producing linear sawtooth voltages in response to an exciting voltage which is subject to reversals of polarity as well as variations of amplitude.

It is an object of this invention to provide a generator of linear sawtooth voltage waveforms which is responsive to an input voltage variable both in amplitude and polarity to produce an output waveform conforming in amplitude and polarity thereto.

It is a further object of the invention to provide such a generator which incorporates means maintaining the linearity of the output waveform through all changes of amplitude and polarity of the input voltage.

It is another object of the invention to provide such a generator in which adjustment of the linearity of the output waveform may be effected individually for each polarity of input voltage.

These and other objects and advantages of the invention are realized in a system in which voltage is applied to effect the charging of a capacitor by way of a pair of unilaterally conductive devices connected oppositely and in parallel and each in series with a respective charging resistor. The voltage across the capacitor is applied to a pair of "bootstrap" positive feedback circuits connected in parallel and each preceded by a unilaterally conductive device, the latter being oppositely connected. Each feedback circuit has its output returned to the input side of the charging resistor of the similarly poled portion of the charging circuit.

The single figure of the drawing is a schematic diagram of a circuit embodying the invention.

Referring now more particularly to the drawing, there is shown a capacitor 1 across which the desired sawtooth voltage is to be developed. One terminal of this capacitor is indicated as the point A and the remaining terminal is connected to ground through a variable resistor 2. The point A is also connected to ground by way of a conventional two way clamp indicated at 3. The clamp may be opened or closed by a pair of square wave gating voltages generated by a gating circuit of conventional form, which is not shown. These voltages are of opposite polarity and are applied at terminals 5 and 6 as indicated.

A charging voltage $E_s$ of a D. C. nature, but subject to variations of amplitude and polarity, which are slow compared to the duration of the desired output waveforms, is applied to the circuit at a terminal 7. This terminal is connected to the anode of diode 8, the cathode of which is connected by way of a resistor 9 to the point A. The terminal 7 is also connected to the cathode of a diode 10, the anode of which is connected to the point A through a pair of serially connected resistors 11 and 12, the resistor 11 being variable.

Voltage appearing at the point A is applied to the anode of a diode 13. The cathode of this tube is connected to the control grid of a cathode biased tube 14, the output of which is coupled by a capacitor 15 to the input of a tube 16 which is connected as a cathode follower. A positive bias is applied to the tube 16 by way of a voltage divider comprising resistors 17 and 18. The cathode load resistor 19 of tube 16 is variable and is coupled to the grid of a succeeding tube 20 by way of a capacitor 21. The anode of this tube is coupled to the cathode of diode 8 by way of a capacitor 22. The tubes 13, 14, 16 and 17 and their associated circuitry constitute a bootstrap amplifier.

A second bootstrap amplifier circuit of similar construction is connected between the point A and the plate of diode 10. In this circuit as shown in the drawing, components are given numbers corresponding to the corresponding components in the amplifier described above, with the numbers primed. The diode 13' has its cathode connected to the point A and its anode to the input of tube 14'. The cathode follower 16' is not provided with a positive biasing means for its grid, as is the corresponding cathode follower 16, since the output of tube 14' is positive and the biasing means is thus not necessary to secure the response of tube 16'.

The point A is also directly coupled to an amplifier 23 wherein the sawtooth waveform generated at point A is amplified to the required magnitude for further use.

In the operation of the system described above, the voltage $E_s$ may be either positive or negative in polarity and of any of a range of amplitudes. This voltage might, for example, be a voltage indicative of the antenna scan of a radar set and the sawtooth voltage to be generated at the point A might be the sweep voltage for use in the deflection circuits of a cathode ray tube. The generation of the sawtooth voltage is initiated by the operation of the clamp 3. When the clamp is closed the point A is clamped to ground. When the clamp is opened by the application of gating voltages of the proper polarity to the terminals 5 and 6 the voltage $E_s$ begins to charge the capacitor 1 with a polarity of charge dependent upon the polarity of the charging voltage. A positive voltage $E_s$ will render diode 8 conductive and charge capacitor 1 through resistor 9, whereas a negative signal voltage $E_s$ will charge the capacitor by way of diode 10 and resistors 11 and 12. Due to the presence of the resistor 2 the sawtooth waveform generated at A will, as indicated by the graph 24, be superimposed upon a step waveform of an amplitude and polarity dependent upon the amplitude and polarity of the voltage $E_s$. The duration of the sawtooth will depend upon the duration of the clamp opening gate voltage applied to the terminals 5 and 6.

Since the sawtooth voltage produced by the action of voltage $E_s$ at point A will have an exponential waveform, the sweep voltage will not be linear, as desired. To produce a linear slope on the sawtooth waveform the voltage across charging resistor 9, or resistors 11 and 12, must be maintained constant. This is accomplished by applying a positive feedback voltage across the resistor being utilized.

The feedback or bootstrap amplifier circuit shown in the upper portion of the drawing and comprising tubes 13, 14, 16 and 20 will accept only positive signals due to the polarity of the connection of tube 13. The sawtooth signal is amplified by the cathode biased amplifier 14 and is capacity coupled to cathode follower 16. A positive bias from voltage divider 17, 18 is sufficiently large to allow the maximum excursion of the negative signal from the plate of tube 14 without cutting off 16. In the cathode circuit of tube 16 is a gain control comprising the variable resistor 19 with which the feedback signals can be varied from zero to a maximum value. The signal from cathode follower 16 is amplified and inverted by tube 20 from which it is applied by way of capacitor 22 to the junction of the cathode of tube 8 and resistor 9. Whenever a feedback signal is applied to this point the diode 8 is cut off since its cathode now becomes positive with respect to its plate. Under this condition capacitor 22 supplies the entire charging current to capacitor 1. By means of gain control 19 the curvature of the sawtooth slope can be varied from a convex to a concave form. With such flexibility of control a large range of adjustment in the linearity of a sweep voltage may be obtained.

When the two way clamp closes again the charge on capacitor 22 is brought back to its normal level by becoming clamped to the voltage $E_s$ through conduction of tube 8. The voltage at point A recovers rapidly to its original level since the capacitor 1 discharges through the low impedance of the two way clamp.

When the voltage $E_s$ becomes negative a negative sawtooth on a step voltage is generated at point A. The tube 10 will now pass the signal voltage and resistors 11 and 12 will be utilized rather than resistor 9. The resistor 11 is made variable for the purpose of matching the amplitude of the negative sawtooth to that of the positive sawtooth for equal values of $E_s$. The diode 13' will now conduct while 13 will be cut off and the bootstrap amplifier illustrated in the lower part of the drawing, and comprising tubes 14', 16' and 20', will be brought into operation and will apply positive feedback voltage to the junction of the cathode of tube 10 and resistor 11. This amplifier is constructed the same as the one previously described in connection with positive sawtooth voltages, except that no voltage divider equivalent to 17, 18 is provided for applying positive bias to the grid of tube 16'. The operation of this feedback amplifier has the same effect on the linearity of a negative sawtooth waveform at point A as the one previously described has on a positive waveform at this point.

What is claimed is:

1. Means for generating, in response to a signal voltage variable in amplitude and polarity, a sawtooth waveform varying in amplitude and polarity in accordance therewith, said means comprising: a capacitor; an input terminal to which said signal voltage is applied; means forming a pair of conductive paths between said input terminal and one terminal of said capacitor, said path forming means consisting of a pair of unilaterally conductive means connected in parallel between said terminals, the last named means being connected for conduction in opposite directions, and at least one resistor in series with each of said conductive means; means intermittently connecting said one terminal to ground; means connecting the remaining terminal of said capacitor to ground; a pair of amplifiers, each of said amplifiers having its output applied to the junction of a respective one of said unidirectionally conductive means and the one of said resistors in series therewith, and means coupling the input of each of said amplifiers to said one terminal of said capacitor, each of said coupling means being polarized in a sense opposite to that of the other.

2. Means for generating, in response to a signal voltage variable in amplitude and polarity, a sawtooth waveform varying in amplitude and polarity in accordance therewith, said means comprising: a capacitor; an input terminal to which said signal voltage is applied; means forming a pair of conductive paths between said input terminal and one terminal of said capacitor, said path forming means consisting of a pair of unilaterally conductive means connected in parallel between said terminals, the last named means being connected for conduction in opposite directions, and at least one resistor in series with each of said conductive means; means intermittently connecting said one terminal to ground; means connecting the remaining terminal of said capacitor to ground; and a pair of amplifying feedback circuits each connected between said one terminal and the junction of a respective one of said unidirectionally conductive means and the one of said resistors in series therewith, each of said feedback circuits being responsive only to voltage of the same polarity as the polarity of the voltage appearing at said input terminal to which said one of said unilaterally conductive means is responsive.

3. Means for generating, in response to a signal voltage variable in amplitude and polarity, a sawtooth waveform varying in amplitude and polarity in accordance therewith, said means comprising: a capacitor; an input terminal to which said signal voltage is applied; means forming a pair of conductive paths between said input terminal and one terminal of said capacitor, said path forming means consisting of a pair of unilaterally conductive means connected in parallel between said terminals, the last named means being connected for conduction in opposite directions, and at least one resistor in series with each of said conductive means; means intermittently connecting said one terminal to ground; means connecting the remaining terminal of said capacitor to ground; and a pair of oppositely polarized bootstrap amplifier circuits connected between said one terminal and respective junctions of said unidirectionally conductive means and the said resistors in series therewith.

References Cited in the file of this patent

UNITED STATES PATENTS

| | | |
|---|---|---|
| 2,443,195 | Pensyl | June 15, 1948 |
| 2,532,338 | Schlesinger | Dec. 5, 1950 |
| 2,597,322 | Higinbotham | May 20, 1952 |
| 2,688,075 | Palmer | Aug. 31, 1954 |